Oct. 3, 1933. C. R. DUGDALE Re. 18,965

EGG CARTON

Original Filed May 22, 1931 2 Sheets-Sheet 1

Inventor
Charles R. Dugdale

By Mason, Fenwick & Lawrence Attorneys

Oct. 3, 1933. C. R. DUGDALE Re. 18,965

EGG CARTON

Original Filed May 22, 1931 2 Sheets-Sheet 2

Inventor
Charles R. Dugdale

By
Mason, Fenwick & Lawrence Attorneys

Reissued Oct. 3, 1933

Re. 18,965

UNITED STATES PATENT OFFICE 18,965

EGG CARTON

Charles R. Dugdale, Fairhaven, Mass.

Original No. 1,892,612, dated December 27, 1932, Serial No. 539,389, May 22, 1931. Application for reissue May 26, 1933. Serial No. 673,124

12 Claims. (Cl. 229—29)

This invention relates to egg cartons of the collapsible type which may be readily assembled and disassembled and folded for packaging.

The main object of the invention is to provide a carton having a body which can be stamped out of a single sheet of material and adapted to be combined with partitions in such manner that the assembled carton when collapsed will fold and occupy substantially the same area as the bottom or top of the assembled carton.

Other objects of the invention will become apparent as the detailed description thereof proceeds.

Figure 1:
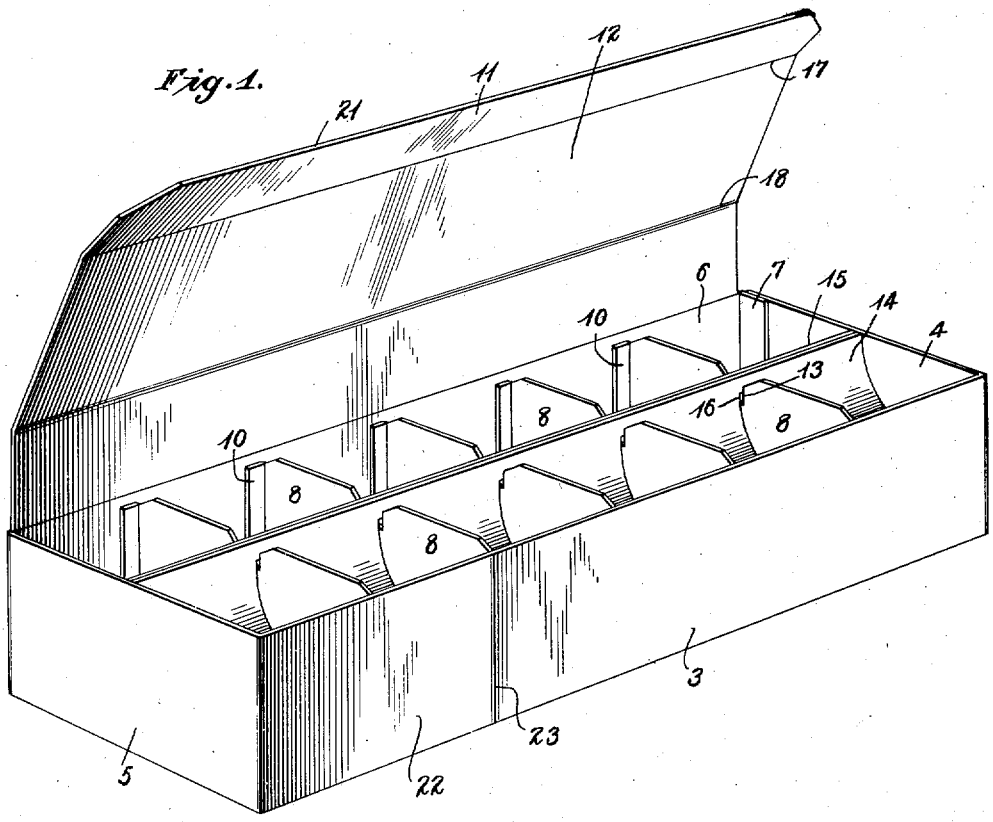
Figure 1 is a view of the carton with the parts thereof in assembled position ready to receive eggs or other articles of similar shape.

As shown in the drawings, the body 1 of the carton (see Figure 6) is stamped from a sheet of cardboard and comprises a central strip 2 creased to form the front wall 3, end walls 4 and 5 and a back wall 6 having a tab 7 at one end thereof adapted to form a means for securing the four walls 3, 4, 5 and 6 in assembled relationship. As shown in Figure 1 of the drawings, the walls of the carton when they are assembled assume a rectangular form and the rear wall 6 is secured to the end wall 4 by means of an adhesive applied to the tab 7 which is then stuck to the wall 4 in the usual manner.

A series of transverse partitions 8 extend between the front and rear walls of the carton and are secured thereto by the tabs 9 and 10, respectively, the said tabs being bent at right angles to the plane of the partitions 8 and being suitably secured to the said front and rear walls. As will be seen from Figure 1 of the drawings, the tabs 9 and 10 are creased at their connection with partitions 8 so that they form hinges about which the front and rear walls may be swung in order to collapse the carton. The tab 9 is shorter than the tab 10 in order to provide for the insertion of the flap 11 of the cover 12 between the front wall 3 and the adjacent ends of the partitions 8.

The upper corners of the partitions 8 are cut off in order to eliminate sharp corners which may catch on objects or the fingers of the person using the carton. The upper edge of the center of each partition 8 is provided with a slot 13 of sufficient width to accommodate two plies of cardboard, and the opposite sides of the slot 13 are cut off at an angle in order to facilitate the insertion of the central walls 14 and 15 into assembled and locked relation in the said slot 13.

Figure 6:
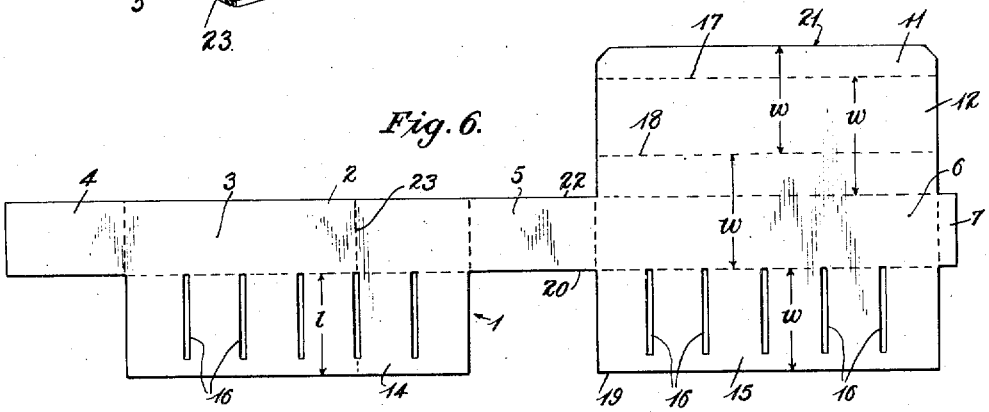
Figure 6 is a plan illustrating in development the body of the carton as stamped out from a sheet of material.
Figure 7:
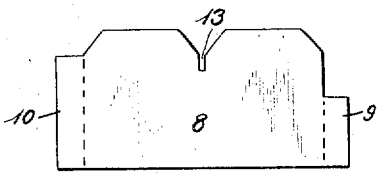
Figure 7 is an elevation of one of the transverse partitions of the carton.

The walls 14 and 15 are each provided with slots 16 through which the partitions 8 are passed. These slots 16 are each of a width slightly greater than the thickness of the partitions 8 so as to provide ventilation for the articles placed within the carton and to permit the ready assembly of the several parts thereof. It will be seen from Figures 1 and 3 of the drawings, that the walls 14 and 15 readily form the bottom of the carton. In the laying out of the parts of the cartons these walls 14 and 15 are made equal in width to the width $w$ of the carton itself in order that the carton when collapsed will occupy the same area as that occupied by the carton assembled. The layout is clearly illustrated in Figure 6 of the drawings which shows the cover 12 as provided with creases 17 and 18 spaced apart so that the several parts of the carton when folded will occupy the same area as the carton does when assembled. As shown in Figure 6, the distance between the upper edge 19 of the wall 15 and the lower edge 20 of the wall 6 is equal to the distance $w$ between this edge 20 and the crease 18, and it is also equal to the distance between the crease 18 and the outer edge 21 of the flap 11. The distance between the upper edge 22 of the rear wall 6 and the crease 17 is also equal to the width $w$ of the carton when assembled. Of course, the wall 14 is exactly the same in width and in all other respects to the wall 15.

It will be seen from Figure 6 of the drawings, that when the rear wall 15 is folded about the lower edge 20 of the wall 6 its edge 19 will coincide with the crease 18 on the cover and when the cover is bent around the crease 18 over the wall 15 the edge 21 of the flap 11 will be even with the edge 20 at the joint between walls 6 and 15.

Figure 2:
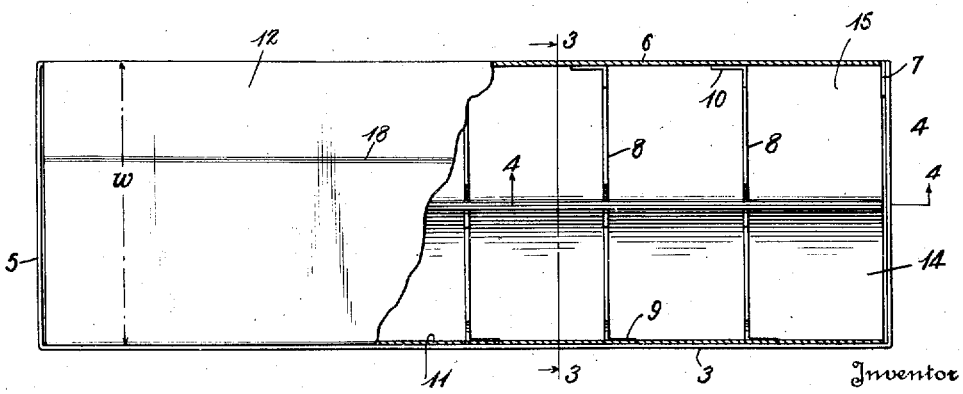
Figure 2 is a top plan view of a closed carton, part of the cover being broken away to show details of construction.
Figure 5:
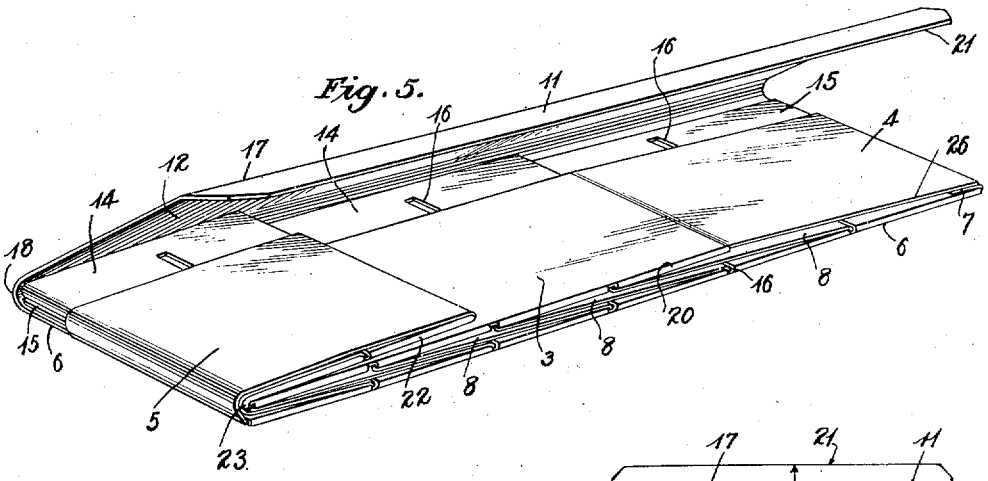
Figure 5 is a perspective view of the carton in collapsed and folded position with the cover raised to show the arrangement of parts of the carton body when folded.

In securing the parts together it will be necessary to pass the cross partitions 8 through the slots 16 in the walls 14 and 15, and to paste or otherwise secure the tabs 9 and 10 to the front and rear walls of the carton in properly spaced relation. It will be evident that the walls 14 and 15 (see Figure 3) may be swung up into contact with the front and rear walls 3 and 6 flat against the inside of these front and rear walls, and that when they are so swung up the front and rear walls may be collapsed about the tabs 9 and 10, as hinges, to bring the front and rear walls together with the central walls 14 and 15 flat between them. This arrangement is shown in Figure 5 of the drawings. In this position the wall 4 with a part 22 of the front wall 3 may be swung about the crease 23 at the hinge of the second cross partition, from the left of the Figure 1, into a position below the cover 12, in which position the cover 12 may be collapsed on the end wall 4, the folded front wall 3 and end wall 5 to completely cover the collapsed carton body, which will then occupy the same area as is shown occupied by the assembled carton of Figure 2 of the drawings.

Figure 3:
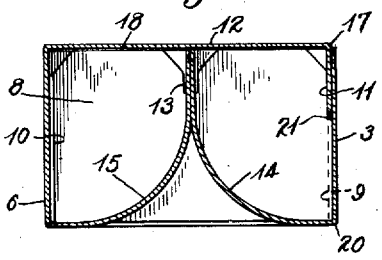
Figure 3 is a transverse section taken on the line 3—3 of Figure 2.
Figure 4:
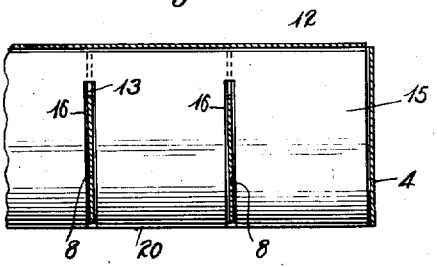
Figure 4 is a longitudinal section taken on the line 4—4 of Figure 2.

The cartons will be shipped in quantities in collapsed condition to the egg packaging plants to be assembled for use. In order to form the carton so as to receive the eggs all that is necessary is to take a folded carton, as shown in Figure 5, raise the cover 12 thereof, straighten out the end wall 4 and the part 22 of the front wall 3 and then swing the said front wall about the transverse partitions 8, as hinges, until the front and end walls of the carton assume a rectangular formation with the central walls 14 and 15 flat against the inside of the front and rear walls respectively. In this position the central walls are bent toward the center of the carton until the upper ends of the slots 16 contact with the bottoms of the slots 13, in which position the upper ends of the two walls 14 and 15 will be in alinement and the curved portions between the partitions 8 form the bottom of the cells adapted to receive eggs. The cover 12 can then be swung about the edge 22 of the rear wall 6 and the flap 11 tucked in between the front wall 3 and the front edges of the partitions 8 to form a completely closed carton, as shown in Figure 3 of the drawings.

I claim:

1. An egg carton comprising a single sheet of cardboard cut and creased to form front, rear and end walls, a top integral with the rear wall, and a two part bottom, said bottom parts respectively integral with the front and rear walls and extending up between said walls with their free inner edges contacting to form a partition bisecting the carton lengthwise, said bottom being provided with slots, and transverse partitions extending through said slots and having their opposite ends suitably secured to the inside of the front and rear walls.

2. An egg carton comprising a sheet of material, cut and creased to form a top, side and end walls with a flap extending from the top edge of one side wall to constitute a top with flaps associated with the bottom edges of the side walls and extending upwardly in the center of the carton with their opposite edges adjoining to form a partition oppositely curved in cross section and bisecting the carton lengthwise, and transverse partitions extending from the first named partition to each of said side walls.

3. An egg carton comprising a sheet of material cut and creased to form a top, side and end walls, with flaps integral with the front and rear walls to form a combined bottom and partition extending lengthwise of the carton between the side walls thereof, said partition being slotted, and transverse partitions extending through the slots of the bottom and partition to opposite walls of said carton, the said central partition and bottom flaps being foldable against the inside faces of the front and rear walls of the carton to permit collapse of the front and rear walls toward each other, and to permit the folding of one end wall and part of the one front wall over the back wall.

4. An egg carton comprising a sheet of cardboard cut and creased to form a top, front, rear and end walls, with bottom forming flaps integral with the front and rear walls, each flap being of substantially the same width as the width of the carton and being curved so that its free edge meets the free edge of the other flap and lies substantially flush with the top edges of the walls of said carton and bisecting the carton lengthwise, and transverse partitions extending between the said flaps and the front and rear walls of the carton.

5. A carton comprising a sheet of cardboard cut and creased to form front, rear and end walls, having bottom forming flaps integral with the front and rear walls, each flap being greater in width than one half the width of the carton and being bent to form a concave partition bisecting the carton lengthwise with the free edges of the flaps in contact with each other and flush with the upper edges of the carton.

6. A carton of sheet material having front and rear walls, flaps extending inwardly from said front and rear walls separately from each other to form the bottom of the carton with the inner ends of said flaps turned upwardly adjacent each other to form a central lengthwise partition therein, said flaps having slots therethrough and being foldable against the inside faces of said front and rear walls, and transverse partitions extending through said slots and secured at their ends to said front and rear walls for folding movement from erected position to a position adjacent the inside faces of said front and rear walls about fold lines lying in the planes of said partitions when in erected position, to permit collapse of said front and rear walls toward each other.

7. A carton made of foldable sheet material and having front and rear walls, flaps separate from each other extending inwardly from said front and rear walls, respectively, to form the bottom of the carton with the inner ends of said flaps turned upwardly adjacent each other to form a substantially central lengthwise partition therein, said flaps having a series of slots therethrough, and a series of transverse partitions extending through said slots and permanently but foldably secured at their ends to said front and rear walls for folding movement toward said front and rear walls about substantially vertical fold lines, said flaps being foldable against the inside faces of said front and rear walls to permit relative folding movement between said transverse partitions and said front and rear walls and the collapse of the latter toward each other.

8. A carton made of foldable sheet material and having front and rear walls, flaps separate from each other extending inwardly from said front and rear walls, respectively, to form the bottom of the carton with the inner ends of said flaps turned upwardly adjacent each other to form a substantially central lengthwise partition therein, said flaps having slots therethrough terminated at a distance from the inner ends thereof, and transverse partitions secured at their ends to said front and rear walls and extending through said slots for engagement with said terminals thereof to support the said flaps, said flaps being foldable adjacent the inside faces of said front and rear walls to permit collapse of said front and rear walls toward each other.

9. A carton made of foldable sheet material and having front and rear walls, flaps separate from each other extending inwardly from said front and rear walls, respectively, to form the bottom of the carton with the inner ends of said flaps turned upwardly adjacent each other to form a substantially central lengthwise partition therein, and transverse partitions secured at their ends to said front and rear walls, said flaps having slots therein through which said transverse partitions extend and of sufficient length to permit the folding of said flaps substantially adjacent the inside faces of said front and rear walls and the collapsing of said front and rear walls toward each other.

10. A carton made of foldable sheet material and having front, rear and top walls, flaps separate from each other folded inwardly from said front and rear walls, respectively, to form the bottom of the carton with the inner ends of said flaps turned upwardly adjacent each other to form a substantially central, lengthwise partition therein, said flaps having slots therethrough terminated at a distance from the inner ends thereof, and transverse partitions permanently but foldably secured at their ends to said front and rear walls and extending through said slots for engagement with said terminals thereof to support the said flaps, said flap slots being of sufficient length to permit the folding of said flaps substantially adjacent the inside faces of said front and rear walls and relative folding between the latter and said transverse partitions and the collapsing of said front and rear walls toward each other.

11. A cellular carton of foldable sheet material for holding fragile articles, comprising front and rear walls, flaps folded inwardly from the bottoms of said walls, respectively, to form the bottom of the carton, with the inner free ends of said flaps turned upwardly adjacent each other to form a substantially central, lengthwise partition therein, said flaps having slots therethrough terminated at a distance from the inner ends thereof, and transverse partitions foldably secured at their ends to said front and rear walls and extending through said flap slots and provided in their upper edges with slots for engagement with said terminals of said flap slots to support said flaps, said flap slots being of sufficient length to permit said flaps to be folded upwardly adjacent the inside faces of said front and rear walls and relative folding between the latter and said transverse partitions so that said front and rear walls may be collapsed toward each other.

12. A cellular carton of sheet material having front and rear walls, flaps separate from each other extending inwardly from said front and rear walls to form the bottom of the carton with the inner ends of said flaps turned upwardly adjacent each other to form a central lengthwise partition therein, said flaps having slots therethrough and being foldable adjacent the inside faces of said front and rear walls, and transverse partitions extending through said slots and secured at their ends to said front and rear walls for folding movement from erected position to a position in which said partitions lie adjacent said flaps in said folded position of said flaps adjacent the inside faces of said front and rear walls.

CHARLES R. DUGDALE.